United States Patent [19]
Joseph

[11] Patent Number: 5,232,770
[45] Date of Patent: Aug. 3, 1993

[54] HIGH TEMPERATURE STABLE NONWOVEN WEBS BASED ON MULTI-LAYER BLOWN MICROFIBERS

[75] Inventor: Eugene G. Joseph, Arden Hills, Minn.

[73] Assignee: Minnesota Mining and Manufacturing Company, St. Paul, Minn.

[21] Appl. No.: 769,095

[22] Filed: Sep. 30, 1991

[51] Int. Cl.$^5$ .................................. D04 1/58
[52] U.S. Cl. .................................. 428/284; 156/167; 428/903; 428/288; 428/297; 428/298
[58] Field of Search ............... 428/284, 287, 297, 298, 428/296, 903, 288; 156/167

[56] References Cited

U.S. PATENT DOCUMENTS

| | | | |
|---|---|---|---|
| 3,487,505 | 1/1970 | Chisholm et al. | 18/13 |
| 3,557,265 | 1/1971 | Chisholm et al. | 264/47 |
| 3,672,802 | 6/1972 | Matsui et al. | 425/131 |
| 3,681,189 | 8/1972 | Matsui et al. | 161/175 |
| 3,684,601 | 8/1972 | Hayward, Jr. | 156/148 |
| 3,687,589 | 8/1972 | Schrenk | 425/109 |
| 3,759,647 | 9/1973 | Schrenk et al. | 425/13 |
| 3,825,379 | 7/1974 | Lohkamp et al. | 425/72 |
| 3,841,953 | 10/1974 | Lohkamp et al. | 161/150 |
| 3,849,241 | 11/1974 | Butin et al. | 161/169 |
| 3,924,990 | 12/1975 | Schrenk | 425/131.1 |
| 3,949,130 | 4/1976 | Sabee et al. | 428/192 |
| 3,971,373 | 7/1976 | Braun | 128/146.2 |
| 4,103,058 | 7/1978 | Humlicek | 428/171 |
| 4,117,194 | 9/1978 | Barbe et al. | 428/374 |
| 4,118,531 | 10/1978 | Hauser | 428/224 |
| 4,197,069 | 4/1980 | Cloeren | 425/131.1 |
| 4,295,809 | 10/1981 | Mikami et al. | 425/72 S |
| 4,375,718 | 3/1983 | Wadsworth et al. | 29/592 E |
| 4,381,274 | 4/1983 | Kessler et al. | 264/147 |
| 4,460,649 | 7/1984 | Park et al. | 428/373 |
| 4,557,972 | 12/1985 | Okamoto et al. | 428/373 |
| 4,627,950 | 12/1986 | Matsui et al. | 264/103 |
| 4,657,802 | 4/1987 | Morman | 428/152 |
| 4,714,647 | 12/1987 | Shipp et al. | 428/903 |
| 4,729,371 | 3/1988 | Krueger et al. | 128/206.19 |
| 4,753,843 | 6/1988 | Cook et al. | 428/903 |
| 4,755,178 | 7/1988 | Insley et al. | 604/367 |
| 4,797,318 | 1/1989 | Brooker et al. | 428/903 |
| 4,818,463 | 4/1989 | Buehning | 264/40.1 |
| 4,818,597 | 4/1989 | Da Ponte et al. | 428/903 |
| 4,863,779 | 9/1989 | Daponte | 428/903 |
| 4,904,521 | 2/1990 | Johnson et al. | 428/903 |
| 4,939,008 | 7/1990 | Komaki | 428/34.3 |
| 4,950,529 | 8/1990 | Ikeda et al. | 428/224 |
| 4,986,743 | 1/1991 | Buehning | 425/7 |
| 5,039,431 | 8/1991 | Johnson et al. | 428/903 |

OTHER PUBLICATIONS

Wente, Van A., "Superfine Thermoplastic Fibers", *Industrial Engineering Chemistry*, vol. 48, pp. 1342–1346.

Wente, Van A. et al., "Manufacturing of Superfine Organic Fibers", Report No. 4364 of the Naval Research Laboratories, published May 25, 1954.

*Primary Examiner*—James J. Bell
*Attorney, Agent, or Firm*—Gary L. Griswold; Roger R. Tamte; William J. Bond

[57] ABSTRACT

A heat-stable melt-blown web of multi-layer microfibers comprising at least two layers of a heat-stable melt-blowable material and at least one included layer of a second material.

9 Claims, 4 Drawing Sheets

HIGH TEMPERATURE STABLE NONWOVEN WEBS BASED ON MULTI-LAYER BLOWN MICROFIBERS

FIELD OF THE INVENTION

The invention relates to novel temperature-stable melt-blown nonwoven webs useful in a variety of applications, and the method for its production. The method includes producing melt-blown microfibers comprised of longitudinally distinct polymeric layers, at least one being a temperature-stable polymeric material.

BACKGROUND OF THE INVENTION

It has been proposed in U.S. Pat. No. 3,841,953 to form nonwoven webs of melt-blown fibers using polymer blends in order to obtain webs having novel properties. A problem with these webs however, is that the polymer interfaces causes weaknesses in the individual fibers that causes severe fiber breakage and weak points. The web tensile properties reported in this patent are generally inferior to those of webs made of corresponding single polymer fibers. The web weakness is likely due to weak points in the web from incompatible polymer blends and the extremely short fibers in the web.

A method for producing bicomponent fibers in a melt-blown process is disclosed in U.S. Pat. No. 4,729,371. The polymeric materials are fed from two conduits which meet at a 180 degree angle. The polymer flowstreams then converge and exit via a third conduit at a 90 degree angle to the two feed conduits. The two feedstreams form a layered flowstream in this third conduit, which bilayered flowstream is fed to a row of side-by-side orifices in a melt-blowing die. The bi-layered polymer melt streams extruded from the orifices are then formed into microfibers by a high air velocity attenuation or a "melt-blown" process. The product formed is used specifically to form a web useful for molding into a filter material. The process disclosed concerns forming two-layer microfibers. The process also has no ability to produce webs where web properties are adjusted by fine control over the fiber layering arrangements and/or the number of layers.

U.S. Pat. No. 4,557,972 discloses a sheath-core composite fiber of an allegedly ultrafine denier (less than 0.5 denier). The fibers are formed from a special spinneret for forming large, three-component fibers, with two of the components forming ultrafine included material in a matrix of the third component. Ultrafine fibers are then obtained by selectively removing the matrix (the "sea") material, leaving the included material as fine fibers. This process is complex and cannot practically be used to form non-woven webs. Similar processes are proposed by U.S. Pat. Nos. 4,460,649, 4,627,950 and 4,381,274, which discuss various "islands-in-a-sea" processes for forming multi-component yarns. U.S. Pat. No. 4,117,194 describes a bi-component textile spun fiber with improved crimp properties.

U.S. Pat. Nos. 3,672,802 and 3,681,189 describe spun fibers allegedly having a large number of layers each of a separate polymer component. The two polymers are fed into a specially designed manifold that repeatedly combines, splits and re-combines a polymer stream(s) to form a somewhat stratified stream of the two distinct polymers. The process disclosed in these two patents is similar to mixing the polymers due to the significant amount of non-linear polymer flow introduced during the repeated splitting and re-combining of the polymer stream(s). However, the splitting and re-combining is done in line with the polymer flow, and the resulting fibers apparently have distinct longitudinal regions of one or the other polymer rather than the substantially non-directional arrangement of separate polymer regions one would obtain with incomplete batch mixing. However, the polymer layers in the fibers are very indistinct and irregular. Further, due to the excessively long contact period between the polymers, it would be difficult to handle polymers with significantly different melt viscosities by this process. The fibers produced are textile size, and the layering effect is done to improve certain properties over homogeneous fibers (not webs) such as dyeability properties, electrification properties, hydrophilic properties or tensile properties.

SUMMARY OF THE INVENTION

The present invention is directed to a nonwoven web of longitudinally layered melt-blown microfibers the microfibers comprised of two or more layers of a heat-stable material and at least one second included layer of a less heat-stable web-forming material. The microfibers are produced by a process comprising first feeding separate polymer melt streams to a manifold means, optionally separating at least one of the polymer melt streams into at least two distinct streams, and combining all the melt streams, including the separated streams, into a single polymer melt stream of longitudinally distinct layers, preferably of the at least two different polymeric materials arrayed, as alternating layers. The combined melt stream is then extruded through fine orifices and formed into a web of melt-blown microfibers.

DESCRIPTION OF THE PREFERRED EMBODIMENTS

The microfibers produced by the invention process are prepared, in part, using the apparatus discussed, for example, in Wente, Van A., "Superfine Thermoplastic Fibers," *Industrial Engineering Chemistry, Vol.* 48, pp 1342-1346 and in Wente, Van A. et al., "Manufacture of Superfine Organic Fibers," Report No. 4364 of the Naval Research Laboratories, published May 25, 1954, and U.S. Pat. Nos. 3,849,241 (Butin et al.), 3,825,379 (Lohkamp et al.), 4,818,463 (Buehning), 4,986,743 (Buehning), 4,295,809 (Mikami et al.) or 4,375,718 (Wadsworth et al.). These apparatuses and methods are useful in the invention process in the portion shown as die 10 in FIG. 1, which could be of any of these conventional designs.

Figure 1:
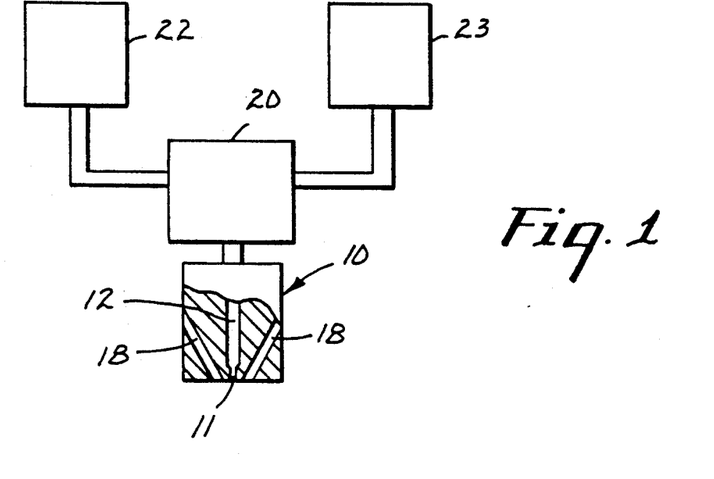
FIG. 1 is a schematic view of an apparatus useful in the practice of the invention method.

The polymeric components are introduced into the die cavity 12 of die 10 from a separate splitter, splitter region or combining manifold 20, and into the, e.g., splitter from extruders, such as 22 and 23. Gear pumps and/or purgeblocks can also be used to finely control the polymer flowrate. In the splitter or combining manifold, the separate polymeric component flowstreams are formed into a single layered flowstream. However, preferably, the separate flowstreams are kept out of direct contact for as long a period as possible prior to reaching the die 10. The separate polymeric flowstreams from the extruder(s) can also be split in the splitter (20). The split or separate flowstreams are combined only immediately prior to reaching the die, or die orifices. This minimizes the possibility of flow instabilities generating in the separate flowstreams after being combined in the single layered flowstream, which tends to result in non-uniform and discontinuous longitudinal layers in the multi-layered microfibers. Flow instabilities can also have adverse effects on nonwoven web properties such as strength, temperature stability, or other desirable properties obtainable with the invention process.

The separate flowstreams are also preferably established into laminar flowstreams along closely parallel flowpaths. The flowsteams are then preferably combined so that at the point of combination, the individual flows are laminar, and the flowpaths are substantially parallel to each other and the flowpath of the resultant combined layered flowstream. This again minimizes turbulence and lateral flow instabilities of the separate flowstreams in and after the combining process. It has been found that a suitable splitter 20, for the above-described step of combining separate flowstreams, is one such as is disclosed, for example, in U.S. Pat. No. 3,557,265, which describes a manifold that forms two or three polymeric components into a multi-layered rectilinear melt flow. The polymer flowstreams from separate extruders are fed into plenums then to one of the three available series of ports or orifices. Each series of ports is in fluid communication with one of the plenums. Each stream is thus split into a plurality of separated flowstreams by one of the series of ports, each with a height-to-width ratio of from about 0.01 to 1. The separated flowstreams, from each of the three plenum chambers, are then simultaneously coextruded by the three series of parts into a single channel in an interlacing manner to provide a multi-layered flowstream. The combined, multi-layered flowstream in the channel is then transformed (e.g., in a coathangar transition piece), so that each layer extruded from the manifold orifices has a substantially smaller height-to-width ratio to provide a layered combined flowstream at the die orifices with an overall height of about 50 mils or less, preferably 15-30 mils or less. The width of the flowstream can be varied depending on the width of the die. Other suitable devices for providing a multi-layer flowstream are such as disclosed in U.S. Pat. Nos. 3,924,990 (Schrenk); 3,687,589 (Schrenk); 3,759,647 (Schrenk et al.) or disclose manifolds for bringing together diverse polymeric flowstreams into a single, multi-layer flowstream that is ordinarily sent through a coathanger transition piece or neck-down zone prior to the film die outlet. The Cloeren arrangement has separate flow channels in the die cavity. Each flow channel is provided with a back-pressure cavity and a flow-restriction cavity, in successive order, each preferably defined by an adjustable vane. The adjustable vane arrangement permits minute adjustments of the relative layer thicknesses in the combined multi-layered flowstream. The multi-layer polymer flowstream from this arrangement need not necessarily be transformed to the appropriate length/width ratio, as this can be done by the vanes, and the combined flowstream can be fed directly into the die cavity 12.

From the die cavity 12, the multi-layer polymer flowstream is extruded through an array of side-by-side orifices 11. As discussed above, prior to this extrusion, the feed can be formed into the appropriate profile in the cavity 12, suitably by use of a conventional coathanger transition piece. Air slots 18, or the like, are disposed on either side of the row of orifices 11 for directing uniform heated air at high velocity at the extruded layered melt streams. The air temperature is generally about that of the meltstream, although preferably 20°–30° C. higher than the melt temperature. This hot, high-velocity air draws out and attenuates the extruded polyeric material, which will generally solidify after traveling a relatively short distance from the die 10. The solidified or partially solidified fibers are then formed into a web by known methods and collected (not shown). The collecting surface can be a solid or perforated surface in the form of a flat surface or a drum, a moving belt, or the like. If a perforated surface is used, the backside of the collecting surface can be exposed to a vacuum or low-pressure region to assist in the deposition of fibers, such as is disclosed in U.S. Pat. No. 4,103,058 (Humlicek). This low-pressure region allows one to form webs with pillowed low-density regions. The collector distance can generally be from 3 to 50 inches from the die face. With closer placement of the collector, the fibers are collected when they have more velocity and are more likely to have residual tackiness from incomplete cooling. This is particularly true for inherently more tacky thermoplastic materials, such as thermoplastic elastomeric materials. Moving the collector closer to the die face, e.g., preferably 3 to 12 inches, will result in stronger inter-fiber bonding and a less lofty web. Moving the collector back will generally tend to yield a loftier and less coherent web.

The temperature of the polymers in the splitter region is generally about the temperature of the higher melting point component as it exits its extruder. The splitter region or manifold is typically integral with the die and is kept at the same temperature. The temperature of the separate polymer flowstreams can also be controlled to bring the polymers closer to a more suitable relative viscosity. When the separate polymer flowstreams converge, they should generally have an apparent viscosity of from 150 to 800 poise, preferably from 200 to 400 poise (as measured by a capillary rheometer). The relative viscosities of the separate polymeric flowstreams to be converged should generally be fairly well matched. Empirically, this can be determined by varying the temperature of the melt and observing the crossweb properties of the collected web. The more uniform the crossweb properties, the better the viscosity match. The overall viscosity of the layered combined polymeric flowstream(s) at the die face should be from 150 to 800 poise. The differences in relative viscosities are preferably generally the same as when the separate polymeric flowstreams are first combined. The apparent viscosities of the polymeric flowstream(s) can be adjusted at this point by varying the temperatures as per U.S. Pat. No. 3,849,241.

The size of the polymeric fibers formed depends to a large extent on the velocity and temperature of the attenuating airstream, the orifice diameter, the temperature of the melt stream, and the overall flow rate per orifice. At high air volume rates, the fibers formed have an average fiber diameter of less than about 10 micrometers, however, there is an increased difficulty in obtaining webs having uniform properties as the air flow rate increases. At more moderate air flow rates, the polymers have larger average diameters, however, with an increasing tendency for the fibers to entwine into formations called "ropes". This is dependent on the polymer flow rates, of course, with polymer flow rates in the range of 0.05 to 0.5 gm/min/orifice generally being suitable. Coarser fibers, e.g., up to 25 micrometers or more, can be used in certain circumstances such as large pore, or coarse, filter webs.

The multi-layer microfibers of the invention process can be admixed with other fibers or particulates prior to being collected. For example, sorbent particulate matter or fibers can be incorporated into the coherent web of blown multi-layered fibers as discussed in U.S. Pat. Nos. 3,971,373 or 4,429,001. In these patents, two separate streams of melt-blown fibers are established with the streams intersecting prior to collection of the fibers. The particulates, or fibers, are entrained into an airstream, and this particulate-laden airstream is then directed at the intersection point of the two microfiber streams. Other methods of incorporating particulates or fibers, such as staple fibers, bulking fibers or binding fibers, can be used with the invention method of forming melt-blown microfiber webs, such as is disclosed, for example, in U.S. Pat. Nos. 4,118,531, 4,429,001 or 4,755,178, Where particles or fibers are delivered into a single stream of melt-blown fibers.

Other materials such as surfactants or binders can be incorporated into the web before, during or after its collection, such as by use of a spray jet. If applied before collection, the material is sprayed on the stream of microfibers, with or without added fibers or particles, traveling to the collection surface.

The microfibers in the novel heat-stable melt-blown web are formed from a combination of at least two distinct layer types. The first layer type comprises a heat-stable melt-blowable material which is used in combination with a second layer type of a relatively non-heat stable but comparably good web-forming layer material.

The relatively heat-stable material can be any heat-stable (a high melting point polymer) polymeric material capable of being melt-blown. These materials are generally highly crystalline and have a high melting point. However, a problem with these materials is that they exhibit a relatively low degree of self-bonding. Self-bonding refers to the ability of the individual fibers to bond to each other when collected on a collecting surface from the melt-blowing die. These heat-stable materials as such form low-strength webs generally lacking the integrity required for most typical applications of melt-blown web products unless post-embossed. For example, as wipes, they will tend to disintegrate under normal use conditions.

Typical examples of such heat-stable materials include polyesters such as polyethylene terephthalate, polyolefins such as poly(4-methyl-1-pentene) or a polyallylene sulfide such as poly(phenylene sulfide). Such materials exhibit relatively high individual fiber strength, yet exceedingly low inter-fiber bonding, and as such form generally low-strength webs even at relatively close collector to die distances. Generally, these materials are characterized as melt-blowable polymers having a glass transition points above room temperature or melt temperatures of greater than 150° C., and preferably greater than 180° C. Preferably, the heat-stable polymers can produce webs that are stable at temperatures above about 130° C., more preferably above 150° C., wherein the web storage modulus is about above $10^6$ dynes/cm$^2$.

The second layer material used in the invention microfibers and web is generally a material exhibiting significantly higher self-bonding characteristics at melt blowing conditions. Typically these materials will exhibit a softening or melting temperature approximately 30° C. below that of the high material, but preferably within 150° C. of the high modulus material melting point. Too large a difference in melting points can render the polymers difficult to coextrude. Generally, the self-bonding component will have a glass transition temperature below room temperature, preferably below about 15° C. For semi-crystalline materials, the crystallization half life at a temperature 15° C. below the melting temperature of the polymer will be greater than 50,000 seconds and preferably greater than 100,000 seconds. For block copolymers of sequential copolymers, the soft segments or the elastomeric segments or blocks will comprise at least about 50 percent of the polymer and preferably at least 30 percent of the polymer. The soft or elastomeric segments or blocks should have a glass transition temperature below room temperature and preferably below about 15° C. The crystallization half life should be as described above for semi-crystalline soft or elastomeric segments or blocks. The preferred materials will be amorphous or semi-crystalline materials exhibiting relatively good bonding characteristics at melt-blowing conditions. These materials will exhibit better performance at high temperatures than highly elastomeric materials. Suitable materials include polyolefins such as polypropylene. However, at certain low volume percentages and high layer numbers certain other low-melting point materials such as elastomeric, melt-blowable materials could be used. This would include polymers such as polyurethanes (e.g., Morthane TM, available from Morton Thiokol Corp.); A-B block copolymers where A is formed of poly(vinyl arenes) moieties such as polystyrene, and B is an elastomeric mid-block such as a conjugated diene or a lower alkene in the form of a liner di- or tri-block copolymer, a star, radial or branch copolymer, (such as elastomers sold as Kraton TM, available from Shell Chemical Company); polyesters (such as Arnitel TM, available from Akzo Plastics Company); or polyamides (such as Pebax TM, available from Autochem Company). Copolymers and blends can also be used. For example, A-B block copolymer blends as described in U.S. Pat. No. 4,657,802 are suitable where such block copolymers are preferably blended with polyalkylenes. Other possible materials include ethylene copolymers such as ethylene vinyl acetate, ethylene/propylene copolymer elastomers, or ethylene/propylene/diene terpolymer elastomers. Blends of the above materials are also contemplated, particularly with additives which would raise the high-temperature performance of these elastomers. For example, up to 50 weight percent, but preferably less than 30 weight percent of the elastomeric copolymer blends could be stiffening aids such as polyvinyl styrenes, polystyrenes such as poly(alpha-methyl styrene), polyesters, epoxys, polyolefins, e.g., polyethylene or certain ethylene/vinyl acetate, preferably those of higher molecular weight, or coumarone indene resin.

The materials comprising the relatively high-bonding layer material can also include conventional additives.

By using relatively low levels (e.g., <50%), of the relatively heat-stable material in combination with the second layer material, as defined herein, the mechanical performance characteristics of the relatively heat-stable material can be obtained. The web will also exhibit the desirable characteristics of the second layer material at lower temperatures.

The heat-stable webs formed of the above described multilayer microfibers have relatively high modulus properties over an extended temperature range. Generally, the webs have been found to have storage modulus values in excess of 1,000,000 Pascals at temperatures of about 150° C. preferably above about 200° C. and most preferably above about 240° C.

Fiber and web modulus is further controllable within wide ranges for given combinations of polymers by varying, independently, the relative ratios of the polymers, the layer order in the microfibers, the number of layers, the collector distance and other process variables. The invention thus allows precise control of web strength by varying one or all of these variables.

Preferably, in filtration or absorbancy applications the high-bonding component comprises an inner layer surrounded by heat-stable layers or when used as an outer layer is a relatively thin layer. This stabilizes the bonding component layer while providing some bonding component material at the layer surface for interfiber bonding. Theoretically, the relative volume percent of the individual layers can vary widely, for example, from 1 to 99 volume percent for each individual layer component. The preferred amount of the individual layer components will depend upon the relative amount of modulus desired with the individual high-temperature web and the desired high-temperature performance required. Generally, the outside layers will contribute significantly to the surface properties forming at the web without significantly modifying the bulk fiber properties, such as tensile strength and modulus behavior when used at a relatively low-volume percent. However, the relatively high-bonding materials can be used as inner layers to contribute to web surface properties at higher volume percents. This is desirable for heat stable web as outer layers of the high temperature stable material provides for more stable fibers even with high volume percents of inner layer, high bonding materials.

With the invention, the web properties are further altered by variations in the number of layers employed at a given relative volume percent and layer arrangement. As described above, variation in the number of layers, at least at a low number of layers, has a tendency to significantly vary the relative proportion of each polymer (assuming two polymeric materials) at the microfiber surface. This (assuming alternating layers of two polymeric materials) translates into variation of those web properties to which the microfiber surface properties significantly contribute. Thus, web properties can change depending on what polymer or composition comprises the outside layer(s). However, as the number of layers increases, this variation in web properties based on surface area effects diminishes. At higher-layer numbers, the relative thicknesses of the individual fiber layers will tend to decrease, significantly decreasing the surface area effect of any individual layer. For the preferred melt-blown microfibers with average diameters of less than 10 micrometers, the individual fiber layer thicknesses can get well below 1 micrometer.

Additional effects on the fiber and web properties can be attributed to the modulation of the number of fiber layers alone. Specifically, it has been found that fiber and web modulus increase with increases in the number of individual layers. Although not wishing to be bound by theory, it is believed that the decrease in individual layer thicknesses in the microfiber has a significant effect on the crystalline structure and behavior of the component polymers. For example, spherulitic growth could be constrained by adjacent layers resulting in more fine-grained structures. Further, the interfacial layer boundaries may constrain transverse polymer flow in the orifice increasing the relative percent of axial flow, tending to increase the degree of order of the polymers in the layered form. These factors can likely influence the macro scale behavior of the component fibers in the web and hence web behavior itself. Further, with increased microfiber layering, the number of interfaces, and interfacial area, between adjacent layers, increases significantly. This could tend to increase fiber stiffness and strength due to increased reinforcement and constrainment of the individual layers. It has also been found that it becomes increasingly difficult to separate the fiber inner layers as the total number of layers in the fibers increase. This is true even for relatively incompatible polymers that would ordinarily require compatibilizers or bonding layers to prevent layer separation.

The number of layers obtainable with the invention process is theoretically unlimited. Practically, the manufacture of a manifold, or the like, capable of splitting and/or combining multiple polymer streams into a very highly layered arrangement would be prohibitively complicated and expensive. Additionally, in order to obtain a flowstream of suitable dimensions for feeding to the die orifices, forming and then maintaining layering through a suitable transition piece can become difficult. A practical limit of 1,000 layers is contemplated, at which point the processing problems would likely outweigh any potential added property benefits.

The webs formed can be of any suitable thickness for the desired end use. However, generally a thickness from 0.01 to 5 centimeters is suitable for most applications. Further, for some applications, the web can be a layer in a composite multi-layer structure. The other layers can be supporting webs, films (such as elastic films, semi-permeable films or impermeable films). Other layers could be used for purposes such as absorbency, surface texture, rigidification and can be nonwoven webs formed of, for example, staple, spunbond and/or melt-blown fibers. The other layers can be attached to the invention melt-blown web by conventional techniques such as heat bonding, binders or adhesives or mechanical engagement, such as hydroentanglement or needle punching. Other structures could also be included in a composite structure, such as reinforcing or elastic threads or strands, which would preferably be sandwiched between two layers of the composite structures. These strands or threads can likewise be attached by the conventional methods described above.

Webs, or composite structures including webs of the invention can be further processed after collection or assembly such as by calendering or point embossing to increase web strength, provide a patterned surface, and fuse fibers at contact points in a web structure or the like; orientation to provide increased web strength; needle punching; heat or molding operations; coating, such as with adhesives to provide a tape structure; or the like.

The following examples are provided to illustrate presently contemplated preferred embodiments and the best mode for practicing the invention, but are not intended to be limiting thereof.

TEST PROCEDURES

Tensile Modulus

Tensile modulus data on the multi-layer BMF webs was obtained using an Instron Tensile Tester (Model 1122) with a 10.48 cm (2 in.) jaw gap and a crosshead speed of 25.4 cm/min. (10 in./min.). Web samples were 2.54 cm (1 in.) in width. Elastic recovery behavior of the webs was determined by stretching the sample to a predetermined elongation and measuring the length of the sample after release of the elongation force and allowing the sample to relax for a period of 1 minute. The tensile modulus at elevated temperatures were measured on a Rhemotric TM RSAII in the strain sweep mode.

Thermal Properties

Melting and crystallization behavior of the polymeric components in the multi-layered BMF webs were studied using a Perkin-Elmer Model DSC-7 Differential Scanning Calorimeter equipped with a System 4 analyzer. Heating scans were carried out at 10° or 20° C. per minute with a holding time of three (3) minutes above the melting temperature followed by cooling at a rate of 10° C. per minute. Areas under the melting endotherm and the crystallization exotherm provided an indication of the amount of crystallinity in the polymeric components of the multi-layered BMF webs.

Storage Modulus

The dynamic mechanical properties were measured using a Rheometrics TM RSAII at a scanning rate of 5°/minute. The frequency of measurement was 6.28 rad/sec at a strain of 0.1 percent. The storage modulus values are given in Pascals [Pa].

EXAMPLE 1

A polypropylene(PP)/poly(phenylene sulfide) (PPS) multi-layer BMF web of the present invention was prepared using a melt-blowing process similar to that described, for example, in Wente, Van A., "Superfine Thermoplastic Fibers," in *Industrial Engineering Chemistry*, Vol. 48, pages 1342 et seq (1956), or in Report No. 4364 of the Naval Research Laboratories, published May 25, 1954, entitled "Manufacture of Superfine Organic Fibers" by Wente, Van A.; Boone, C. D.; and Fluharty, E. L., except that the BMF apparatus utilized two extruders, each of which was equipped with a gear pump to control the polymer melt flow, each pump feeding a five-layer feedblock (splitter) assembly similar to that described in U.S. Pat. Nos. 3,480,502 (Chisholm et al.) and 3,487,505 (Schrenk) which was connected to a melt-blowing die having circular smooth surfaced orifices (10/cm) with a 5:1 length to diameter ratio. The first extruder (300° C.) delivered a melt stream of a 35 melt flow rate (MFR) polypropylene (PP) resin (PP 3085, available from Exxon Chemical Corp.), to the feedblock assembly which was heated to about 310° C. The second extruder, which was maintained at about 310° C., delivered a melt stream of a (PPS) resin (—Ryton TM GR-04, available from Phillips Petroleum Corp.) to the feedblock. The polymer melt streams were merged in an alternating fashion into a five-layer melt stream on exiting the feedblock, with the outer layers being the PPS resin.

The gear pumps were adjusted so that a 50:50 gear pump ratio PPS:PP polymer melt was delivered to the feedblock assembly and a 0.11 kg/hr/cm die width (0.6 lb/hr/in.) polymer throughput rate was maintained at the BMF die. The primary air temperature was maintained at approximately 310° C. and at a pressure suitable to produce uniform web with a 0.076 cm gap width. Webs were collected at a collector to BMF die distance of 30.5 cm (12 in.) The resulting BMF web, comprising five-layer microfibers having an average diameter of less than about 10 micrometers, had a basis weight of 100 gm/m². A portion of the BMF web was consolidated by calendering at 130° C. and 3 torr.

EXAMPLE 2

A BMF web having a basis weight of 100 gm/m² and comprising five-layer microfibers having an average diameter of less than about 10 micrometers was prepared according to the procedure of Example 1, except that the gear pumps were adjusted so that a 75:25 gear pump ratio PP:PPS polymer melt was delivered to the feedblock assembly. A portion of the BMF web was consolidated by calendering at 150° C. and 3 torr.

CONTROL WEB I

A control web of the 35 MFR polypropylene resin was prepared according to the procedure of Example 1, except that only one extruder, which was at 300° C., was used, and it was connected directly to the BMF die through a gear pump. The die and air temperatures were maintained at 320° C. The resulting BMF web had a basis weight of 100 gm/m² and an average fiber diameter of less than about 10 micrometers.

Figure 2:
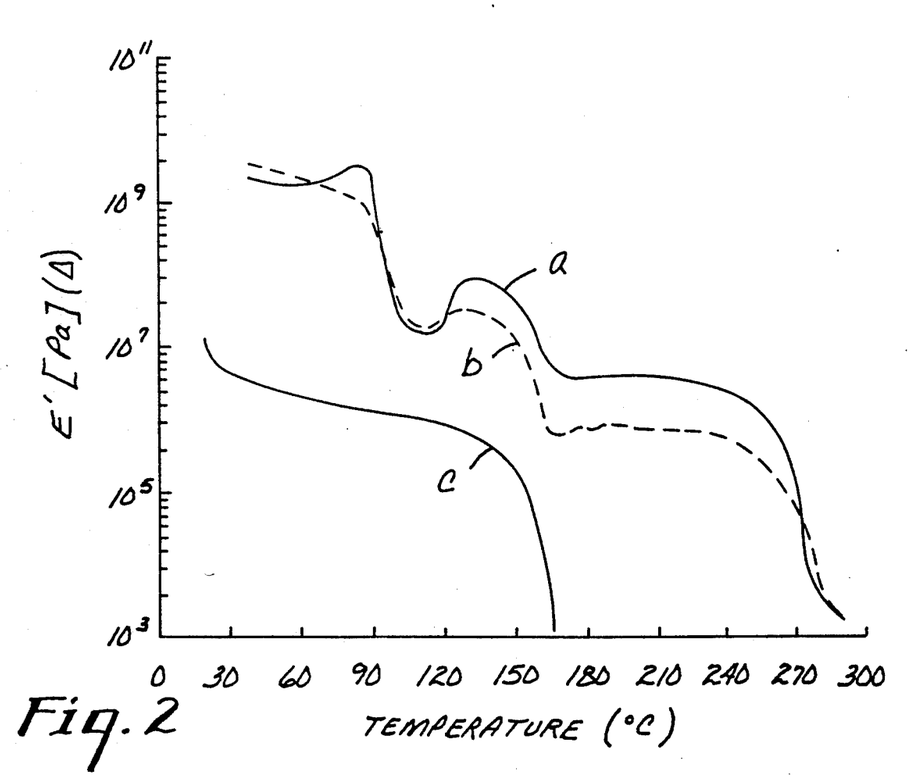
FIGS. 2, 4 and 5 are plots of storage modulus versus temperature showing the effect of multilayer microfibers on high temperature web performance.

FIG. 2 is a plot comparing the storage modulus (E') of the multi-layer BMF webs of Examples 1 and 2. and Control Web I, a, b and c respectively, which is a polypropylene BMF web, as the webs were exposed to increasing temperatures. An examination of the plot indicates that the presence of PPS, even at the 25 weight percent level, significantly improves the thermal properties of the web, with the PPS containing webs showing good integrity until the PPS melt temperature was reached. It would be highly unlikely that similar performance would be realized from a 75/25 weight percent blend of PP and PPS, as in the blend PP would be the continuous phase and the web would likely fail as soon as the melting temperature of PP was reached.

The tensile modulus of the consolidated webs of Examples 1 and 2 were also measured at temperatures of 125° C., 150° C. and 175° C., all of which are in or above the melting region of PP. The data for these measurements are reported in Table 1.

TABLE 1

| WEB MODULUS AT ELEVATED TEMPERATURES FOR FIVE-LAYER PP/PPS BMF WEBS | | | | |
|---|---|---|---|---|
| | Web | Tensile Modulus (kPa) | | |
| Example | Composition | 125° C. | 150° C. | 175° C. |
| 1 | 50/50 PP/PPS | 48276 | 34483 | 13793 |
| 2 | 75/25 PP/PPS | 27586 | 6897 | 4828 |

EXAMPLE 3

A BMF web having a basis weight of 100 gm/m² and comprising five-layer microfibers having an average diameter of less than about 10 micrometers was prepared according to the procedure of Example 1, except that a 35 MFR polypropylene resin (PP3085, available from Exxon Chemical Corp.) and a poly(ethyleneterephthalate) resin (PET, having an I.V.=0.60, and a melting point of about 257° C. prepared as described in U.S. Pat No. 4,939,008, col. 2, line 6 to Col. 3, line 20) were used (in a 75:25 ratio), both the PP and the PET melt streams were delivered to the five-layer feedblock at about 300° C., the die temperature was maintained at 300° C., and the air temperature maintained at 305° C. The outer layers were PP.

EXAMPLE 4

A BMF web having a basis weight of 100 gm/m$^2$ and comprising five-layer microfibers having an average diameter of less than about 10 micrometers was prepared according to the procedure of Example 3, except that the PP and PET melt streams were delivered to the five-layer feedblock in a 50:50 ratio.

EXAMPLE 5

A BMF web having a basis weight of 100 gm/m$^2$ and comprising five-layer microfibers having an average diameter of less than about 10 micrometers was prepared according to the procedure of Example 3, except that the PP and PET melt streams were delivered to the five-layer feedblock in a 25:75 ratio.

CONTROL WEB II

A control web of the poly(ethylene terephthalate) (I.V.=0.60) resin was prepared according to the procedure of Example 1, except that only one extruder, which was maintained at about 300° C., was used which was connected directly to the BMF die through a gear pump, and the die and air temperatures were maintained at 300° C. and 305° C., respectively. The resulting BMF web had a basis weight of 100 gm/m$^2$ and an average fiver diameter of less than about 10 micrometers.

Table 2 summarizes the tensile modulus values for BMF webs comprising five-layer microfibers of varying PP/PET compositions.

TABLE 2

Tensile Modulus
Five-Layer PP/PET BMF Webs
100 g/m$^2$ Basis Weight

| Example | Pump Ratio PP/PET | MD Tensile Modulus (kPa) |
| --- | --- | --- |
| Control I | 100:0 | 23179 |
| 3 | 75:25 | 12110 |
| 4 | 50:50 | 9669 |
| 5 | 25:75 | 4738 |
| Control II | 0:100 | 772 |

EXAMPLE 6

A BMF web having a basis weight of 100 gm/m$^2$ and comprising two-layer microfibers having an average diameter of less than about 10 micrometers was prepared according to the procedure of Example 3, except that the PP and PET melt streams were delivered to a two-layer feedblock in a 75:25 ratio.

EXAMPLE 7

A BMF web having a basis weight of 100 gm/m$^2$ and comprising three-layer microfibers having an average diameter of less than about 10 micrometers was prepared according to the procedure of Example 3, except that the PP and PET melt streams were delivered to a three-layer feedblock in a 75:25 ratio.

EXAMPLE 8

A BMF web having a basis weight of 100 gm/m$^2$ and comprising two-layer microfibers having an average diameter of less than about 10 micrometers was prepared according to the procedure of Example 3, except that the PP and PET melt streams were delivered to a two-layer feedblock in a 50:50 ratio.

EXAMPLE 9

A BMF web having a basis weight of 100 gm/m$^2$ and comprising three-layer microfibers having an average diameter of less than about 10 micrometers was prepared according to the procedure of Example 3, except that the PP and PET melt streams were delivered to a three-layer feedblock in a 50:50 ratio.

EXAMPLE 10

A BMF web having a basis weight of 100 gm/m$^2$ and comprising two-layer microfibers having an average diameter of less than about 10 micrometers was prepared according to the procedure of Example 3, except that the PP and PET melt streams were delivered to a two-layer feedblock in a 25:75 ratio.

EXAMPLE 11

A BMF web having a basis weight of 100 gm/m$^2$ and comprising three-layer microfibers having an average diameter of less than about 10 micrometers was prepared according to the procedure of Example 3, except that the PP and PET melt streams were delivered to a three-layer feedblock in a 25:75 ratio.

Table 3 summarizes the modulus for a series of PP: PET BMF webs having varying compositions and numbers of layers in the microfibers.

TABLE 3

Web Modulus as a Function of Composition and Layers
PP/PET Combinations
100 g/m$^2$ Basis Weight

| Example | Pump Ratio | Number of Layers | MD Tensile Modulus (kPa) |
| --- | --- | --- | --- |
| Control III | 100/0 | 1 | 23179 |
| 6 | 75/25 | 2 | 16855 |
| 7 | 75/25 | 3 | 19807 |
| 3 | 75/25 | 5 | 12110 |
| 8 | 50/50 | 2 | 7228 |
| 9 | 50/50 | 3 | 13186 |
| 4 | 50/50 | 5 | 9669 |
| 10 | 25/75 | 2 | 4283 |
| 11 | 25/75 | 3 | 6448 |
| 5 | 25/75 | 5 | 4738 |
| Control II | 0/100 | 1 | 772 |

EXAMPLE 12

A BMF web having a basis weight of 100 gm/m$^2$ and comprising five-layer microfibers having an average diameter of less than about 10 micrometers was prepared according to the procedure of Example 1, except that a 35 MFR polypropylene resin (P-3085) and a poly(4-methyl-1-pentene) resin (TPX TM, available from Mitsui as MX-007) were used, the PP and TPX TM melt streams were delivered to the five-layer feedblock at about 300° C. and about 340° C., respectively at a 75:25 ratio, and the feedblock, die and air temperatures were maintained at 340° C., 340° C., respectively. The outer layers were PP.

EXAMPLE 13

A BMF web having a basis weight of 100 gm/m² and comprising five-layer microfibers having an average diameter of less than about 10 micrometers was prepared according to the procedure of Example 12, except that the PP and TPX melt streams were delivered to the five-layer feedblock in a 50:50 ratio.

EXAMPLE 14

A BMF web having a basis weight of 100 gm/m² and comprising five-layer microfibers having an average diameter of less than about 10 micrometers was prepared according to the procedure of Example 12, except that the PP and TPX melt streams were delivered to the five-layer feedblock in a 25:75 ratio.

A control web of the poly(4-methyl-1-pentene) resin was prepared according to the procedure of Example 1, except that only one extruder, which was maintained at about 340° C., was used which was connected directly to the BMF die through a gear pump, and the die (and feedblock) and air temperatures were maintained at 340° C. and 330° C., respectively. The resulting BMF web had a basis weight of 100 gm/m² and an average fiber diameter of less than about 10 micrometers.

Table 4 summarizes the tensile modulus values for BMF webs comprising five-layer microfibers of varying PP/TPX compositions.

TABLE 4

Tensile Modulus
Five-Layer PP/TPX BMF Webs
100 g/m² Basis Weight

| Example | Pump Ratio PP/TPX | MD Tensile Modulus (kPa) |
| --- | --- | --- |
| Control III | 100:0 | 23179 |
| 12 | 75:25 | 12207 |
| 13 | 50:50 | 5159 |
| 14 | 25:75 | 4793 |
| Control IV | 0:100 | 1883 |

EXAMPLE 15

A BMF web having a basis weight of 100 gm/m² and comprising two-layer microfibers having an average diameter of less than about 10 micrometers was prepared according to the procedure of Example 12, except that the PP and TPX melt streams were delivered to a two-layer feedblock in a 75/25 ratio.

EXAMPLE 16

A BMF web having a basis weight of 100 gm/m² and comprising three-layer microfibers having an average diameter of less than about 10 micrometers was prepared according to the procedure of Example 12, except that the PP and TPX melt streams were delivered to a three-layer feedblock in a 75/25 ratio.

EXAMPLE 17

A BMF web having a basis weight of 100 gm/m² and comprising two-layer microfibers having an average diameter of less than about 10 micrometers was prepared according to the procedure of Example 12, except that the PP and TPX melt streams were delivered to a two-layer feedblock in a 50/50 ratio.

EXAMPLE 18

A BMF web having a basis weight of 100 gm/m² and comprising three-layer microfibers having an average diameter of less than about 10 micrometers was prepared according to the procedure of Example 12, except that the PP and TPX melt streams were delivered to a three-layer feedblock in a 50/50 ratio.

EXAMPLE 19

A BMF web having a basis weight of 100 gm/m² and comprising two-layer microfibers having an average diameter of less than about 10 micrometers was prepared according to the procedure of Example 12, except that the PP and TPX melt streams were delivered to a two-layer feedblock in a 25/75 ratio.

EXAMPLE 20

A BMF web having a basis weight of 100 gm/m² and comprising three-layer microfibers having an average diameter of less than about 10 micrometers was prepared according to the procedure of Example 12, except that the PP and TPX melt streams were delivered to a three-layer feedblock in a 25/75 ratio.

Table 5 summarizes the modulus for a series of PP/TPX BMF webs having varying compositions and numbers of layers in the microfibers.

TABLE 5

Web Modulus as a Function of Composition and Layers
PP/TPX Combinations

| Example | Pump Ratio | Number of Layers | MD Tensile Modulus (kPa) |
| --- | --- | --- | --- |
| Control III | 100/0 | 1 | 23179 |
| 15 | 75/25 | 2 | 14945 |
| 16 | 75/25 | 3 | 14014 |
| 12 | 75/25 | 5 | 12207 |
| 17 | 50/50 | 2 | 6655 |
| 18 | 50/50 | 3 | 6186 |
| 13 | 50/50 | 5 | 5159 |
| 19 | 25/75 | 2 | 3897 |
| 20 | 25/75 | 3 | 4145 |
| 14 | 25/75 | 5 | 4793 |
| Control IV | 0/100 | 1 | 1883 |

EXAMPLE 21

A BMF web having a basis weight of 100 gm/m² and comprising five-layer microfibers having an average diameter of less than about 10 micrometers was prepared according to the procedure of Example 3, except that the collector distance was 27.9 cm.

EXAMPLE 22

A BMF web having a basis weight of 50 gm/m² and comprising five-layer microfibers having an average diameter of less than about 10 micrometers was prepared according to the procedure of Example 21, except that the PP and PET melt streams were delivered to the five-layer feedblock such that the outer layer of the fibers was PET rather than PP (O/I vs I/O for Example 21).

Figure 3:
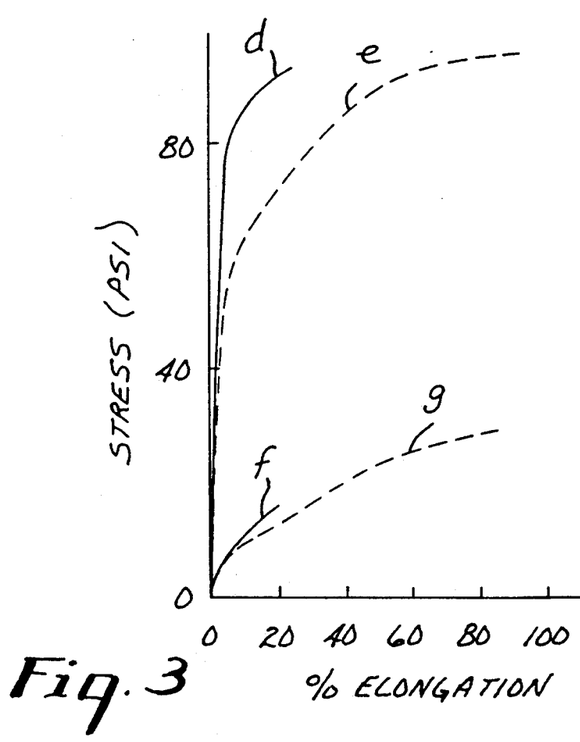
FIG. 3, is a plot of stress - strain data showing the effect of the choice of outside layer material.

Table 6 summarizes the MD peak load and peak stress for two five-layer PP/PET microfiber webs where the order of polymer feed into the feedblock was reversed, thereby inverting the composition of the outer layer of the microfiber. This is also shown in FIG. 3 where d and e correspond to Example 21 elongated in the machine and cross directions, respectively, and f and g correspond to Example 22 elongated in the machine and cross direction respectively.

TABLE 6

Effect of Outside Component
Five-Layer 75/25 PP/PET Pump Ratio
50 g/m² Basis Weight

| Example | Layer Composition | MD Peak Load (kg) | Peak Stress (kPa) |
|---|---|---|---|
| 21 | O/I | 2.1 | 593 |
| 22 | I/O | 0.4 | 124 |

EXAMPLE 23

A BMF web having a basis weight of 100 gm/m² having an average diameter of less than about 10 micrometers was prepared according to Example 4 except that the PP and PET melt streams were delivered to a twenty-seven layer feedblock.

Figure 4:
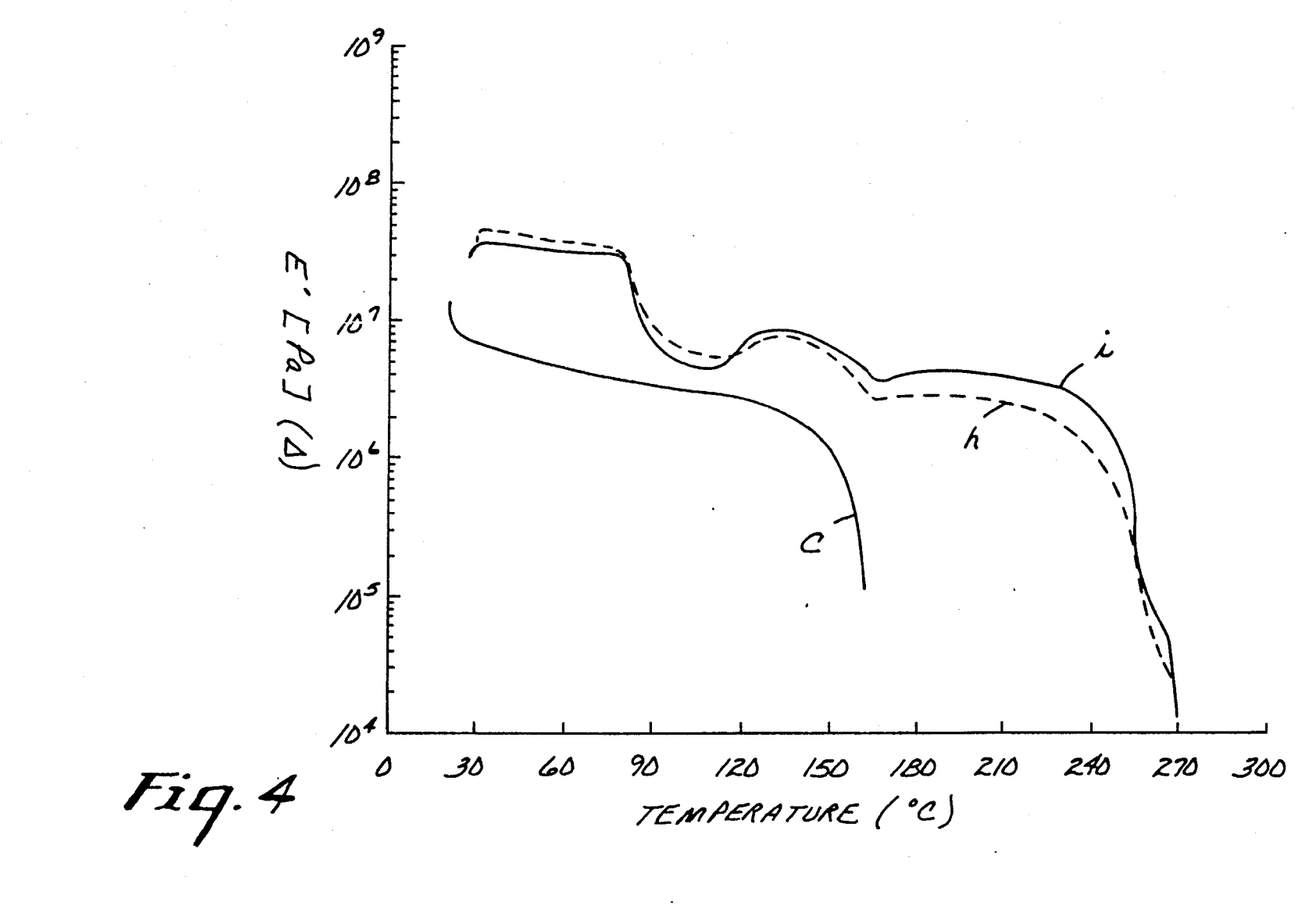

FIG. 4 is a plot comparing the storage modulus ($E^1$) of the multi-layer BMF webs of Examples 4 and 23 and Control Web I, (h, i and c, respectively) as per FIG. 2.

The plot indicates that the increased layering improves the high temperature performance slightly and both Examples are vastly superior in high temperature performance compared to the Control Web.

EXAMPLE 24

A BMF web having a basis weight of 100 gm/m² having an average diameter of less than about 10 micrometers was prepared according to Example 13 except that the PP and TPX melt streams were delivered to a twenty-seven-layer feedblock.

Figure 5:
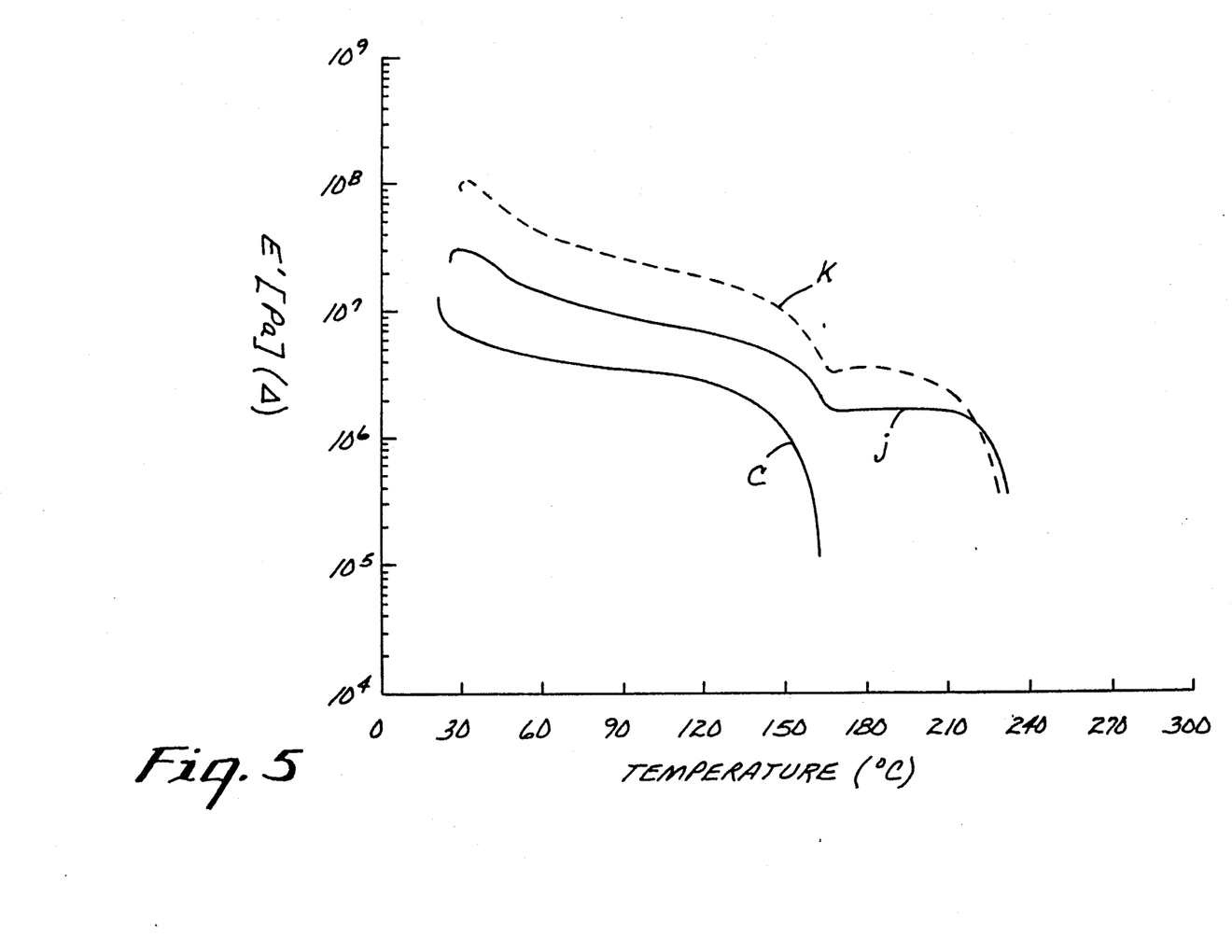

FIG. 5 is a plot comparing the storage modulus ($E^1$) of the multi-layer BMF webs of Examples 13 and 24 and Control Web I, (j, k and c, respectively), as per FIG. 2.

The plot indicates generally increased layering improves high temperature performance and that layering with TPX provide webs of superior high temperature performance compared to Control Web I.

The various modifications and alteration of this invention will be apparent to those skilled in the art without departing from the scope and spirit of this invention, and this invention should not be restricted to that set forth herein for illustrative purposes.

We claim:

1. A nonwoven web comprised of melt-blown microfibers, each of said microfibers having at least three substantially continuous and coplanar layers throughout said microfiber length, the at least three layers comprised of at least two first layers of a temperature stable material capable of forming a nonwoven web stable at temperatures above about 130° C. and at least one second layer of a lower softening point material having a melting point greater than 30° C. less than the first layer material, wherein at least two first layers surround at least one second layer.

2. The nonwoven web of claim 1 wherein the web exhibits storage modulus values of greater than $10^6$ Pa at temperatures in excess of 150° C.

3. The nonwoven web of claim 1 wherein the temperature stable material comprises a polyester and the second layer material comprises a polyolefin.

4. The nonwoven web of claim 1 wherein the temperature stable material comprises of polyalkylsulfide and the second layer material comprises of polyolefin.

5. The nonwoven web of claim 1 wherein the average fiber diameter is less than 10 micrometers.

6. The nonwoven web of claim 1 wherein the temperature-stable material has a melt temperature of greater than 150° C.

7. The nonwoven web of claim 1 wherein the temperature-stable material has a melt temperature of greater than 180° C.

8. The nonwoven web of claim 2 wherein the storage modulus values are greater than $10^6$ Pa at temperatures in excess of 200° C.

9. The nonwoven web of claim 8 wherein the storage modulus values are greater than $10^6$ Pa at temperatures in excess of 240° C.

* * * * *

UNITED STATES PATENT AND TRADEMARK OFFICE
CERTIFICATE OF CORRECTION

PATENT NO. : 5,232,770
DATED : August 3, 1993
INVENTOR(S) : Eugene G. Joseph

It is certified that error appears in the above-identified patent and that said Letters Patent is hereby corrected as shown below:

Column 3, line 51, after "or" and before "disclose", insert --4,197,069 (Cloeren), all of which, except Cloeren,--.

Column 6, line 6, after "high" and before "material", insert --modulus--.

Column 12, line 67, delete "340°C.," and insert therefor --340°C., 340°C., and 330°C.,--.

Column 14, line 44, delete "100" and insert therefor --50--.

Signed and Sealed this

Twenty-ninth Day of March, 1994

Attest:

BRUCE LEHMAN

Attesting Officer

Commissioner of Patents and Trademarks